United States Patent Office 3,357,925
Patented Dec. 12, 1967

3,357,925
METHOD OF PREPARING VANADATE PHOSPHORS
Albert K. Levine, Beechhurst, Frank C. Palilla, Maspeth, and Maija Rinkevics, Brooklyn, N.Y., assignors to General Telephone and Electronics Laboratories, Inc., a corporation of Delaware
Filed Oct. 29, 1964, Ser. No. 407,336
6 Claims. (Cl. 252—301.4)

ABSTRACT OF THE DISCLOSURE

A method of preparing phosphor compositions having the general formula $(A_{1-x}B_x)VO_4$ where A is yttrium or an element of the lanthanide series, B is a lanthanide element and $x$ has a value up to 0.2. By controlling the ratio $V/A+B$ and the firing temperature, phosphors of predetermined particle size may be synthesized. Consequently, phosphors having particle sizes and size distributions specifically tailored to different applications such as cathode ray tubes and high pressure mercury vapor lamps may be obtained by the disclosed method.

Figure 1:
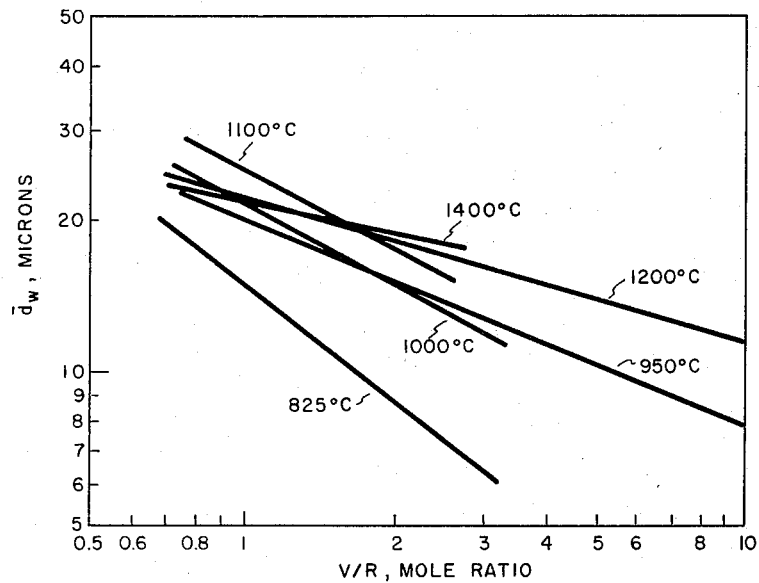

This invention relates to a method of making phosphor compositions and in particular to a method of preparing vanadate phosphor compositions having particles of predetermined size.

In our copending U.S. patent application Ser. No. 334,565, filed Dec. 30, 1963, now abandoned, there is disclosed a family of phosphors in which the host crystal consists essentially of a vanadate of at least one trivalent metal activated by a trivalent rare-earth metal. The trivalent metals are selected from the group consisting of yttrium and the rare-earth elements of the lanthanide series having atomic numbers 58 to 71 (type 4$f$). The activators are selected from the type 4$f$ rare-earth elements including europium, holminum, thulium, gadolinium, erbium, dysprosium and samarium.

Certain of these phosphors are particularly well suited for use in cathode-ray tube color screens and for color correction of high pressure mercury lamps. However, to obtain optimum performance, the size and size distribution of the phosphor particles must fall within specific ranges which depend upon the type of device in which the phosphor is used and the process by which the phosphor is incorporated into the device.

For example, in the "dusting" process of forming tri-color phosphor screens a layer of photosensitive resin-forming material such as polyvinyl alcohol is spread over the faceplate of a cathode ray tube. A phosphor which emits light of a desired color when irradiated by an electron beam is dusted over the photosensitive layer and the layer then exposed to ultraviolet radiation through precisely located openings in a mask. The ultraviolet radiation polymerizes the portions of the photosensitive layer which are not covered by the mask and, when the rest of the layer is washed away, the phosphor dots remain incorporated in the light-fixed polyvinyl alcohol layer coating the faceplate. This process is then repeated with each of the other phosphors to form the screen. [Further details of the dusting process may be found in U.S. Patent 3,025,161 granted to T. V. Rychlewski on Mar. 13, 1962.] When the dusting process is employed for manufacturing cathode-ray tubes, best results are obtained with phosphors having an average particle diameter by weight of $15 \pm 8$ microns. In particular, it has been found that if europium-activated yttrium vanadate is used as the red-emitting phophor the optimum average diameter by weight for particles of this material is in the range 10 to 20 microns. [An average diameter of 15 microns, as measured with a Coulter Counter, is roughly equivalent to an average diameter of 9 microns as measured with a Fischer Sub Sieve Sizer.]

Another method of applying phosphors to the faceplate of a cathode-ray tube is known as the "slurry" process. In this technique, which is described in detail by S. Levy and A. K. Levine in a paper, "The Preparation of Phosphor Screens for Color Television Tubes," Journal of Electrochemical Society, vol. 101, No. 2, February 1954, the photosensitive resin binder is blended into a paste with one of the color-emitting phosphors. The paste is applied to the glass faceplate in a thin film and then exposed to light passing through openings in a mask. The unexposed areas (which have not been polymerized) are washed away and the process then repeated for the other two phosphors. It has been found that when this method of manufacturing color television screens is employed, the optimum average diameter by weight of the phosphor particles is between 0.5 and 7.0 microns. Also, to obtain a uniform dot structure, a narrow range of particle diameter is required.

In the manufacture of high pressure mercury lamps, a coating of a color-correcting phosphor is often applied to the inner surface of a transparent envelope surrounding the arc tube discharge source. Europium activated yttrium vanadate is suitable for this application and for optimum lamp efficiency and color correction the average particle diameter by weight should be in the vicinity of 13 microns. Thus, it is evident that a method of producing phosphors having particles of predetermined size and narrow size distribution ranges is necessary for optimum performance is selected applications.

Various methods are known for preparing phosphors having particles within specified diameters. Size reduction can readily be obtained by grinding the particles in a ball mill or similar device; however, this type of treatment will generally decrease the efficiency of the phosphor. Particle size may also be controlled to some extent by regulating the temperature at which the components are reacted during synthesis of the phosphor. However, it is quite difficult to control the size of phosphor particles by temperature alone and the distribution of particle size is usually wider than desired for a given application. Further, the amount of particle growth which can be attained by control of temperature alone is severely limited within practical temperature ranges and the resulting particles often deviate excessively from the desired crystalline habit.

Accordingly, it is an object of our invention to provide an improved method of preparing phosphors in which the host crystal consists of a vanadate of a trivalent metal (hereinafter called a vanadate phosphor).

It is another object to provide a method of preparing phosphors having particles of predetermined size characteristics.

Still another object is to provide a method of preparing vanadate phosphors of predetermined particle size without the introduction of contaminating substances.

Yet another object is to provide a method of preparing vanadate phosphors in which the crystal habit is highly symmetrical and uniform.

A further object is to provide a method of making vanadate phosphors having particle sizes particularly suited for use in cathode-ray tube screens.

A still further object is to provide vanadate phosphors having particle sizes suitable for use in mercury lamps.

The determination of the size of the individual phosphor particles is complicated by the fact that the particles are not only irregular in shape but the assortment of shapes often differs widely within a given sample. One method of expressing the size of an irregular particle is in terms of its equivalent diameter; i.e. the diameter of a sphere having the same volume as that of the particle. This diameter may be determined by use of suitable measuring apparatus such as the Coulter Counter manufactured by the Coulter Electronics Co., Chicago, Ill., which counts and sizes individual particles suspended within a liquid medium. In this device, the suspended particles are forced to flow through a small aperture of known dimensions having an electrode positioned on each side. As each particle passes through the aperture, it displaces its own volume of electrolyte thereby producing a change in the electrical resistance across the aperture which generates a voltage pulse having an amplitude proportional to the volume of the particle. By the use of appropriate pulse height discrimination equipment, the number of particles having volumes (and therefore equivalent diameter) within predetermined limits may be established. Assuming the density of the particles within any sample to be the same, the average diameter by weight $\bar{d}_w$ is the equivalent of a particle having a weight which is equal to the weight mean for the entire sample. That is, the total weight of the particles having a weight greater than that of a particle of average diameter $\bar{d}_w$ is equal to the total weight of those particles having a weight less than this amount.

The average diameter may also be determined by an actual microscopic count of the particles. In this case the average diameter is $$\bar{d}_w = \frac{\sum N_i d_i^4}{\sum N_i d_i^3}$$

where $N_i$ is the frequency of occurrence of particles having a diameter $d_i$ obtained by averaging the major and the minor dimensions of the particles.

Since there can be any number of size distributions which will give the same average diameter, the shape of the distribution curve is important to a characterization of the crystallites. This distribution may be indicated by specifying the diameters at upper and lower limits of a particle size range which embraces 16 to 84 percent of the particles by weight. These diameters will be designated $d_{16}$ and $d_{84}$ respectively.

In accordance with our invention, we have discovered a method of making phosphor compositions wherein the particles of the resulting composition have a predetermined average diameter and wherein most of the particles have diameters which do not differ substantially from the average value. More particularly, we have found an improved method of preparing phosphor compositions in which particle control is promoted by the use of a flux which also constitutes a reaction ingredient of the final product. In one embodiment of the invention, a phosphor composition consisting essentially of a stoichiometric orthovanadate of at least one trivalent metal is prepared by blending an oxygenated vanadium flux with a trivalent metal compound, firing the blend at a predetermined temperature, and then allowing the resultant phosphor composition to cool to room temperature. The vanadium flux provides a solvent in which the phosphor crystals can form and also acts as one of the reactants forming the compound. In this way, crystal size control is achieved without incorporating foreign material into the phosphor.

As shall be shown hereinafter, the average particle size and particle distribution of the stoichiometric phosphor composition are determined by the mole ratio of the vanadium to the trivalent metal reacted during its preparation. At a constant reaction temperature, the average particle diameter decreases and the particle distribution narrows as the mole ratio of the vanadium to trivalent metal or metals increases.

The trivalent metals are selected from the group consisting of yttrium and the rare-earth elements of the lanthanide series having atomic numbers 58 to 71 (type 4$f$). The oxygenated vanadium flux is preferably either vanadium pentoxide $V_2O_5$ or ammonium vanadate $NH_4VO_3$ although other vanadium compounds may also be used. The trivalent metal compound blended with the vanadate flux may be selected from the rare-earth oxides or the rare earth salts such as the oxalates.

The resulting phosphors may be represented by the formula $(A_{1-x}B_x)VO_4$, where A is one or more trivalent metals selected from the group consisting of yttrium and the type 4$f$ rare earth elements, B is an activator also selected from the group consisting of the type 4$f$ rare earth elements, and $x$ equals the mole fraction of the activator B and is a number between zero and 0.2. The average particle diameter $\bar{d}_w$ is a function of the ratio $V/R$ where $R=A+B$. As indicated by the fact that the method is applicable when $x$ equals zero, the process for controlling particle size does not depend upon an activator B being present.

Figure 2:
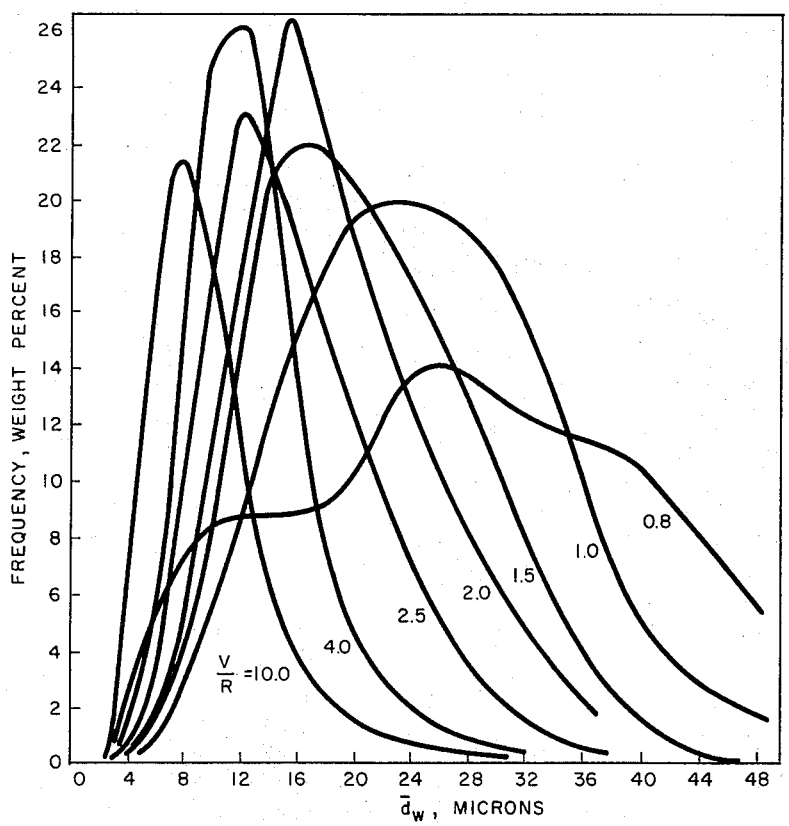

The above objects of and the brief introduction to the present invention will be more fully understood and further objects and advantages will become apparent from a study of the following description in connection with the drawing wherein FIG. 1 is a graph on log-log coordinates showing the relationship between the average particle diameter $\bar{d}_w$ of europium activated yttrium vanadate phosphors and the ratio of vanadium to yttrium-plus-europium used during their synthesis at different temperatures, and FIG. 2 is a graph showing the relationship between size and frequency of the particles for different vanadium to yttrium-plus-europium ratios at a fixed temperature.

A series of orthovanadate phosphors was prepared by the following procedure:

A trivalent metal oxide $R_2O_3$ (wherein $R=A+B$) was dissolved in nitric acid $HNO_3$ and subsequently precipitated as the oxalate using a solution of oxalic acid $H_2C_2O_4 \cdot 2H_2O$. The precipitate was then blended with an oxygenated vanadium flux selected from the group consisting of ammonium vanadate $NH_4VO_3$ and vanadium pentoxide $V_2O_5$ after which the blend was heated in a furnace to a predetermined temperature for about two hours and allowed to cool. In preparing these phosphors, the mole ratio of the vanadium to the trivalent metals $V/R$ was varied between 0.8 and 10.0 and the temperature between 825° C. and 1400° C. The resulting phosphor was in each case a stoichiometric orthovanadate $A_{1-x}B_xVO_4$ (where $x$ equals the mole fraction of the activator B) having an average particle size and distribution within predetermined limits. It was found that at constant temperature, an increase in the $V/R$ ratio in the mixture resulted in a decrease in average particle diameter and a narrowing of the particle diameter distribution. Also, the influence of changes in the $V/R$ ratio decreased as the temperature was increased.

FIG. 1 is a plot of the average particle diameter $\bar{d}_w$ of a number of europium-activated yttrium vanadate samples $Y_{1-x}Eu_xVO_4$ against the vanadium to yttrium plus-europium ratio $V/R$ for various synthesis temperatures. Plotted on log-log coordinates the relationship between the average particle diameter and the $V/R$ ratio is a straight line and may be expressed by the formula $$\bar{d}_w = b(V/R)^a$$

where $a$ is the slope of the line and $b$ is the value of $\bar{d}_w$ when the $V/R$ ratio equals 1.0. Thus, a phosphor having a desired average particle size may be synthesized by selecting a $V/R$ ratio and temperature which will produce particles of the desired average diameter $\bar{d}_w$.

FIG. 2 is a size-frequency isotherm showing a series of curves for samples in which the average particle diameter $\bar{d}_w$ is plotted against the frequency in weight percent for various $V/R$ ratios and a firing temperature of 950° C. As shown, the average particle diameter decreases as the $V/R$ ratio increases and there is some narrowing in the distribution of the particle diameters.

Using the Coulter Counter method of measuring particle size there is a tendency for the phosphor particles to adhere to each other thereby affecting the accuracy of the measurement. That is, several adhered particles passing between the electrodes may be counted as a single particle. To prevent this, the phosphors were coated with a thin layer of silica. This thin silica layer amount to 0.1% by weight of the total sample and has no significant effect on the intrinsic particle size.

The following examples are illustrative of our method of producing europium activated yttrium vanadate and other stoichiometric orthovanadates having predetermined average particle diameters. Although yttrium was used as the trivalent metal in most of the examples and europium as the activator, it shall be understood that the method is also applicable to all orthovanadates of the type 4f trivalent metals with or without activation.

EXAMPLE I

It was desired to prepare a batch of europium activated yttrium vanadate having average particle diameters $\bar{d}_w$ of about 15 microns. From FIGS. 1 and 2, it was determined that a $V/R$ ratio of 2.0 and a firing temperature of 950° C. should produce particles of the desired size. Accordingly, 257.4 grams of yttrium oxide $Y_2O_3$ and 21.12 grams of europium oxide $Eu_2O_3$ were dissolved in 460 milliliters of 70% nitric acid and subsequently precipitated as oxalates using 765 grams of oxalic acid in 5.2 liters of water. The precipitate was then washed with a 2% oxalic acid solution, dried and blended with 561.55 grams of ammonium vanadate. The mixture was then placed in open silicon dioxide boats, slowly heated in a furnace to 950° C. and maintained at this temperature for 2 hours. It was removed from the furnace, allowed to cool to room temperature and washed with 10% sodium hydroxide, then with water and finally dried and sieved through a 325 mesh sieve. As determined by the Coulter Counter and microscopic examination, the resulting crystallities had an average diameter by weight $d_w$ of 15.8 microns and ranged between 10.5 and 23.0 microns of this value at the 84 and 16 percent by weight limits $\bar{d}_{84}$ and $\bar{d}_{16}$ respectively. The composition of the phosphor was $Y_{0.95}Eu_{0.05}VO_4$.

EXAMPLE II

Example I was repeated except this time it was desired to obtain a sample of europium activated yttrium vanadate $Y_{0.95}Eu_{0.05}VO_4$ having an average particle diameter $\bar{d}_w$ between 10 and 12 microns. Accordingly, 128.7 grams of $Y_2O_3$ and 10.56 grams of $Eu_2O_3$ were blended with 561.55 grams of $NH_4VO_3$ flux and the blend reacted at 950° C. to obtain a $V/R$ ratio of 4.0. The resulting crystallites had an average particle diameter of about 11 microns and diameters of 7.5–15 microns respectively at the 84% and 16% by weight limits of the sample. Again the composition was given by the formula $Y_{0.95}Eu_{0.05}VO_4$.

EXAMPLE III

Example I was repeated using a reaction temperature of 950° C. and the quantities of $Y_2O_3$ and $NH_4VO_3$ required to obtain $V/R$ ratios of 1.0, 1.5, 2.5 and 10. The results are shown in Table I.

TABLE I

| $Y_2O_3$, grams | $Eu_2O_3$, grams | $NH_4VO_3$, grams | $V/R$ | $\bar{d}_w$, microns | $\bar{d}_{16}$, microns | $\bar{d}_{84}$, microns |
|---|---|---|---|---|---|---|
| 514.8 | 42.24 | 561.55 | 1.0 | 22.0 | 34.2 | 13.2 |
| 386.1 | 31.68 | 561.55 | 1.5 | 17.5 | 26.7 | 11.3 |
| 257.4 | 21.12 | 561.55 | 2.0 | 15.8 | 23.0 | [1] 10.5 |
| 205.9 | 16.89 | 561.55 | 2.5 | 13.0 | 19.2 | 8.6 |
| 128.7 | 10.56 | 561.55 | 4.0 | 10.9 | 10.0 | [2] 7.5 |
| 51.48 | 4.22 | 561.55 | 10.0 | 7.57 | 11.2 | 4.9 |

[1] Example I.
[2] Example II.

As indicated by the figures and Table I, the average particle diameter $\bar{d}_w$ is, on a logarithmic scale, linearly related to the $V/R$ ratio at constant temperature making it possible to determine the compositions required to synthesize phosphors having predetermined average diameter. At a firing temperature of 950° C., for example, the average diameter $\bar{d}_w$ is related to the $V/R$ ratio by the approximate relationship $$\bar{d}_w = 19.9(V/R)^{-0.42}$$

EXAMPLE IV

A series of $Y_{0.95}Eu_{0.05}VO_4$ phosphor samples was prepared by the procedure of Example I using the $V/R$ values and firing temperatures shown in Table II. It was found that as essentially linear relationship exists over the entire range of $V/R$ ratio and firing temperatures. However, the influence of the $V/R$ ratio on the value of $\bar{d}_w$ decreased with increasing temperature as indicated by overall decrease in slope from about −0.78 at a firing temperature of 825° C. to −0.19 at 1400° C. It should be noted that the influence of $V/R$ is relatively unchanged within the temperature range of 950° to 1100° C. The reduced effect of variations in the $V/R$ ratio at elevated temperatures is believed due to the kinetics of the decomposition of ammonium vanadate to vanadium pentoxide and the subsequent volatilization of the vanadium pentoxide before it can exert a maximum effect on the particle size.

TABLE II

| Temp., °C. | V/R | | | | | | |
|---|---|---|---|---|---|---|---|
| | 0.8 | 1.0 | 1.5 | 2.0 | 2.5 | 4.0 | 10.0 |
| 825: | | | | | | | |
| $\bar{d}_w$ | 19.1 | 13.6 | 10.4 | 8.90 | 7.40 | | |
| $\bar{d}_{16}$ | 37.6 | 26.69 | 16.12 | 13.35 | 10.88 | | |
| $\bar{d}_{84}$ | 16.9 | 7.99 | 6.98 | 5.89 | 5.06 | | |
| 950: | | | | | | | |
| $\bar{d}_w$ | 19.1 | 22.0 | 17.5 | 15.8 | 13.0 | 10.9 | 7.57 |
| $\bar{d}_{16}$ | 35.9 | 34.10 | 26.6 | 22.9 | 18.98 | 15.26 | 11.2 |
| $\bar{d}_{84}$ | 7.55 | 13.17 | 11.44 | 10.53 | 8.55 | 7.52 | 4.92 |
| 1,000: | | | | | | | |
| $\bar{d}_w$ | 25.5 | 20.4 | 16.8 | 15.7 | 12.9 | | |
| $\bar{d}_{16}$ | 40.03 | 30.4 | 25.37 | 21.98 | 19.09 | | |
| $\bar{d}_{84}$ | 9.01 | 12.07 | 11.05 | 10.4 | 8.66 | | |
| 1,100: | | | | | | | |
| $\bar{d}_w$ | 28.7 | 17.4 | 20.1 | 17.9 | 15.6 | | |
| $\bar{d}_{16}$ | 42.76 | 25.4 | 29.75 | 27.21 | 24.18 | | |
| $\bar{d}_{84}$ | 11.81 | 10.94 | 12.97 | 11.62 | 9.23 | | |
| 1,200: | | | | | | | |
| $\bar{d}_w$ | 23.1 | 21.4 | 20.3 | 24.4 | 16.4 | 12.6 | 11.2 |
| $\bar{d}_{16}$ | 40.66 | 34.45 | 32.07 | 34.16 | 22.8 | 18.4 | 22.18 |
| $\bar{d}_{84}$ | 8.56 | 12.44 | 12.16 | 14.88 | 11.23 | 8.13 | 7.09 |
| 1,400: | | | | | | | |
| $\bar{d}_w$ | 24.5 | 20.3 | 19.2 | 18.2 | 19.4 | | |
| $\bar{d}_{16}$ | 39.2 | 30.25 | 28.22 | 27.48 | 27.35 | | |
| $\bar{d}_{84}$ | 8.81 | 12.93 | 12.72 | 12.21 | 12.60 | | |

These values are in close agreement with the relationship $$\bar{d}_w = b(V/R)^a$$

where $a$ and $b$ have the following values at the listed firing temperatures.

Temperature ($t$) °C.: Slope ($a$)
825 ............................................ −0.78
950 ............................................ −0.42
1000 ........................................... −0.53
1100 ........................................... −0.53
1200 ........................................... −0.31
1400 ........................................... −0.19

The slope ($a$) is related to the temperature ($t$) by the approximate equation $$a = -6.7 \times 10^6 (t)^{-2.34}$$

EXAMPLE V

The method of Example I was repeated using a number of values of $V/R$ ratio and firing temperatures except that vanadium pentoxide $V_2O_5$ was substituted for the ammonium vanadate $NH_4VO_3$. The number of grams of $V_2O_5$ was 0.78 multiplied by the number of grams of $NH_4VO_3$ used in Examples I to IV. The same particle size control was obtained using $V_2O_5$ as when $NH_4VO_3$ was used except that the average particle diameter was slightly smaller.

EXAMPLE VI

The method of the previous examples were repeated for several values of $V/R$ ratio and firing temperatures using gadolinium and lutetium in place of yttrium and samarium and dysprosium in place of europium. Also, samples were prepared in which the activator was omitted. In each case the average particle diameter of the phosphor samples fell within the ranges specified in Examples I to VI.

Summarizing, we have invented a method of preparing polycrystalline stoichiometric orthovanadate phosphors of the type $(A_{1-x}B_x)VO_4$ in which the average particle diameter can be closely controlled by properly selecting the ratio of $V/R$ and the firing temperature. The resulting phosphors have a particle distribution such that most of the particles have diameters which fall within a relatively narrow band about the average value. Also, the crystal habit is highly symmetrical and uniform.

As many changes could be made in the above described methods without departing from the scope thereof, it is intended that all matter contained therein shall be interpreted as illustrative and not in a limiting sense.

What is claimed is:

1. A method of preparing a vanadate phosphor composition having particles of predetermined size wherein the host crystal of said phosphor consists essentially of an orthovanadate of at least one trivalent metal, said method comprising the steps of
   (a) blending a flux consisting of a material selected from the group consisting of ammonium vanadate and vanadium pentoxide with a trivalent metal compound, said compound having a host component selected from the group consisting of the oxides and oxalates of yttrium and the rare-earth elements of the lanthanide series and an activator component selected from the group consisting of the oxides and oxalates of the rare-earth elements of the lanthanide series, the mole ratio of vanadium to the trivalent metals in said blend being between 1.0 and 10.0, said mole ratio being selected to produce a phosphor composition having particles of said predetermined size after said blend is fired at a predetermined temperature in the range 825° C. to 1400° C.,
   (b) firing said blend in a furnace at said predetermined temperature, said flux providing, during firing, one of the reactants from which said vanadate composition is formed, and
   (c) removing the resultant phosphor from the furnace and allowing it to cool to room temperature, said phosphor having particles of said predetermined size.

2. The method of preparing a phosphor composition defined by claim 1 wherein said trivalent metal compound consists of yttrium and europium oxides.

3. A method of preparing a vanadate composition having particles of predetermined size comprising the steps of
   (a) blending a flux consisting of a material selected from the group consisting of ammonium vanadate and vanadium pentoxide with a trivalent metal compound selected from the group consisting of the oxides and oxalates of yttrium and the rare-earth elements of the lanthanide series, the mole ratio of vanadium to the trivalent metals in said blend being between 1.0 and 10.0, said mole ratio being selected to produce a composition having particles of said predetermined size after said blend is fired at a predetermined temperature in the range 825° C. to 1400° C.,
   (b) firing said blend in a furnace at said predetermined temperature, said flux providing, during firing, one of the reactants from which said vanadate composition is formed, and
   (c) removing the resultant composition from the furnace and allowing it to cool to room temperature, said composition having particles of said predetermined size.

4. A method of preparing a phosphor composition of predetermined average particle diameter having the formula $A_{1-x}B_xVO_4$ wherein A is one or more trivalent metals selected from the group consisting of yttrium and the type 4f rare earth metals, B is an activator selected from the group consisting of the type 4f rare earth elements, and $x$ is between 0 and 0.2, said method comprising the steps of (a) dissolving a trivalent metal oxide $R_2O_3$, wherein R equals $A+B$, in an acid solution,
(b) precipitating said trivalent metal as an oxalate in a soluble of oxalic acid,
(c) blending said precipitate with a flux consisting of a material selected from the group consisting of ammonium vanadate and vanadium pentoxide, the mole ratio $V/R$ being between 0.8 and 10.0 depending upon the average particle diameter desired,
(d) firing said blend by heating it in air in a furnace to a temperature in the range 825° C. to 1400° C., and
(e) removing said blend from the furnace and allowing it to cool to room temperature.

5. The method of preparing a phosphor composition of predetermined average particle diameter as defined by claim 4 wherein the trivalent metal A is selected from the group consisting of yttrium, gadolinium and lutetium and B is selected from the group consisting of europium, samarium and dysprosium.

6. The method of preparing polycrystalline europium activated yttrium orthovanadate having particles with an average diameter of between 11 and 22 microns by weight comprising the steps of (a) dissolving yttrium and europium oxides in nitric acid,
(b) precipitating said yttrium and europium as an oxalate in a solution of oxalic acid,
(c) blending said precipitate with ammonium vanadate, the mole ratio of vanadium to yttrium-plus-europium being between 1.0 and 4.0 depending upon the average particle diameter desired,
(d) firing said blend in air in a furnace at about 950° C. for aproximately two hours,
(e) removing said blend from the furnace and allowing it to cool to room temperature,
(f) washing the resultant phosphor with sodium hydroxide and water, and
(g) drying said phosphor.

References Cited
UNITED STATES PATENTS

| | | | |
|---|---|---|---|
| 3,152,085 | 10/1964 | Ballman et al. | 252—301.4 |
| 3,250,722 | 5/1966 | Borchardt | 252—301.4 |
| 3,291,747 | 12/1966 | Lefever et al. | 252—301.4 |

TOBIAS E. LEVOW, *Primary Examiner.*

R. D. EDMONDS, *Assistant Examiner.*